US012041082B2

(12) United States Patent
Lam

(10) Patent No.: US 12,041,082 B2
(45) Date of Patent: *Jul. 16, 2024

(54) COUNTER INTELLIGENCE BOT

(71) Applicant: AT&T Intellectual Property I, L.P., Atlanta, GA (US)

(72) Inventor: Yeeling Lam, Bridgeton, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/174,722

(22) Filed: Feb. 27, 2023

(65) Prior Publication Data
US 2023/0231877 A1 Jul. 20, 2023

Related U.S. Application Data

(63) Continuation of application No. 16/995,883, filed on Aug. 18, 2020, now Pat. No. 11,616,808, which is a (Continued)

(51) Int. Cl.
H04L 9/40 (2022.01)
(52) U.S. Cl.
CPC ...... *H04L 63/1466* (2013.01); *H04L 63/1416* (2013.01); *H04L 63/1425* (2013.01); *H04L 63/1433* (2013.01); *H04L 63/145* (2013.01)
(58) Field of Classification Search
CPC ............. H04L 63/1466; H04L 63/1416; H04L 63/1425; H04L 63/1433; H04L 63/145; H04L 2463/144
See application file for complete search history.

(56) References Cited

U.S. PATENT DOCUMENTS 7,412,721 B2 8/2008 Torii et al.
7,526,808 B2 4/2009 Lynn et al.
(Continued)

FOREIGN PATENT DOCUMENTS

WO 2015/134008 A1 9/2015
WO 2017/145001 A1 8/2017

OTHER PUBLICATIONS

Artail, Hassan, et al., "A Hybrid Honeypot Framework for Improving Intrusion Detection Systems in Protecting Organizational Networks", Computers & Security, 25, No. 4, http://booksc.org/book/3489376/f7076f, doi:10.1016/j.cose.2006.02.009, 2006, pp. 274-288.

(Continued)

*Primary Examiner* — Mohammad W Reza
(74) *Attorney, Agent, or Firm* — GUNTIN & GUST, PLC; Atanu Das

(57) ABSTRACT

Techniques are provided that facilitate responding to cyberattacks using counter intelligence (CI) bot technology. In one embodiment, a first system is disclosed that comprises a processor and a memory. The memory can store executable instructions that, when executed by the processor, facilitate performance of operations including receiving a request from a second system requesting assistance in association with a cyberattack on the second system, wherein the request comprises information indicating a type of the cyberattack. The operations further comprise selecting a counter intelligence bot configured to respond to the type of cyberattack, and directing the counter intelligence bot to respond to the cyberattack, wherein the directing comprises enabling the counter intelligence bot to respond to the cyberattack by establishing a gateway with the second system and employing the gateway to intercept and respond to traffic associated with the cyberattack on behalf of the second system.

20 Claims, 10 Drawing Sheets

Related U.S. Application Data continuation of application No. 15/828,643, filed on Dec. 1, 2017, now Pat. No. 10,785,258.

(56) References Cited

U.S. PATENT DOCUMENTS

| | | | |
|---|---|---|---|
| 8,171,544 | B2 | 5/2012 | Black et al. |
| 8,407,787 | B1 | 3/2013 | Lou et al. |
| 8,474,004 | B2 | 6/2013 | Leone |
| 8,763,122 | B2 | 6/2014 | Huston |
| 9,178,900 | B1 | 11/2015 | Li et al. |
| 9,258,321 | B2 | 2/2016 | Amsler et al. |
| 9,264,441 | B2 | 2/2016 | Todd et al. |
| 9,519,781 | B2 | 12/2016 | Golshan et al. |
| 9,531,752 | B2 | 12/2016 | Gribble et al. |
| 9,672,360 | B2 | 6/2017 | Barkan |
| 9,674,222 | B1 | 6/2017 | Joffe |
| 9,729,567 | B2 | 8/2017 | Silva et al. |
| 10,817,606 | B1 | 10/2020 | Vincent |
| 2002/0066034 | A1 | 5/2002 | Schlossberg et al. |
| 2008/0052359 | A1 | 2/2008 | Golan et al. |
| 2012/0260343 | A1 | 10/2012 | Sun et al. |
| 2012/0272317 | A1 | 10/2012 | Rubin et al. |
| 2014/0109182 | A1* | 4/2014 | Smith ............... H04L 63/1416 726/3 |
| 2014/0250524 | A1 | 9/2014 | Meyers et al. |
| 2015/0074811 | A1 | 3/2015 | Capalik |
| 2016/0014081 | A1* | 1/2016 | Don, Jr. ............. H04L 63/0236 726/11 |
| 2016/0080414 | A1 | 3/2016 | Kolton et al. |
| 2016/0164894 | A1 | 6/2016 | Zeitlin et al. |
| 2016/0308910 | A1 | 10/2016 | Carver et al. |
| 2017/0034128 | A1 | 2/2017 | Paul et al. |
| 2017/0034212 | A1 | 2/2017 | Dixon et al. |
| 2017/0099305 | A1 | 4/2017 | Schwartz et al. |
| 2018/0084005 | A1 | 3/2018 | Dousti et al. |
| 2018/0167412 | A1 | 6/2018 | Barrett et al. |
| 2018/0176251 | A1 | 6/2018 | Belikovetsky et al. |
| 2019/0012456 | A1* | 1/2019 | Moore .................. G06N 20/00 |
| 2019/0155225 | A1* | 5/2019 | Kothandaraman .. G05B 13/041 |

OTHER PUBLICATIONS

Baecher, Paul, et al., "The Nepenthes Platform: An Efficient Approach to Collect Malware", Recent Advances in Intrusion Detection, Springer Berlin/Heidelberg, http://syssec.rub.de/media/emma/veroeffentlichungen/2012/08/07/Nepenthes-RAID06.pdf, LNCS 4219, 2006, pp. 165-184.

Jansen, Wayne, et al., Applying Mobile Agents to Intrusion Detection and Response, National Institute of Standards and Technology, Computer Security Division, http://adams.all.net/books/standards/NIST-CSRC/csrc.nist.gov/publications/nistir/ir6416.pdf, Oct. 1999, pp. 1-46.

Wang, Kun, et al., "Attack Detection and Distributed Forensics in Machine-to-Machine Networks", IEEE Network, vol. 30, No. 6, http://folk.uio.no/yanzhang/IEEENetworkDec2016.pdf, Nov./Dec. 2016, pp. 49-55.

Non-Final Office Action received for U.S. Appl. No. 15/828,643 dated Dec. 31, 2019, 25 pages.

Non Final Office Action received for U.S. Appl. No. 16/995,883 dated Aug. 4, 2022, 47 pages.

Notice of Allowance received for U.S. Appl. No. 16/995,883 dated Nov. 30, 2022, 38 pages.

* cited by examiner

COUNTER INTELLIGENCE BOT

RELATED APPLICATIONS

The subject patent application is a continuation of, and claims priority to each of, U.S. patent application Ser. No. 16/995,883, filed Aug. 18, 2020, and entitled "COUNTER INTELLIGENCE BOT," which is a continuation of U.S. patent application Ser. No. 15/828,643 (now U.S. Pat. No. 10,785,258), filed Dec. 1, 2017, and entitled "COUNTER INTELLIGENCE BOT," the entireties of which priority applications are hereby incorporated by reference herein.

TECHNICAL FIELD

The subject disclosure relates generally to cyber security and more particularly to systems, computer-implemented methods, apparatus and/or computer program products that facilitate responding to cyberattacks using counter intelligence (CI) bot technology.

BACKGROUND

The number of Internet of Things (IoT) devices being added to various facets of daily life is increasing at an exponential rate. From the smart home, to healthcare, to connected cars, the IoT is bringing increased connectivity to consumers and enhancing their lives in the process. However, the cyberattack surface in this ecosystem is enormous. The eagerness for autonomous technology has resulted in security becoming an afterthought, rendering many existing IoT devices vulnerable to cyberattacks. The increased connectivity and complexity of IoT systems further presents new risks and threats to personal safety, security and privacy. These risks are present wherever the use of sensors and software are applied. This includes household fixtures, implanted and wearable medical devices, smart cities where public services utilize technology with the aim of improving efficiency and quality, and critical national infrastructure, such as power grids and railway systems. The IoT security challenge is further compounded by the fact that cyberattack techniques and strategies are constantly evolving. Accordingly, techniques for providing and improving cyber security for IoT devices are imperative to protect the personal safety, security and privacy of all entities operating in the connected world of the future.

DETAILED DESCRIPTION

Figure 1:
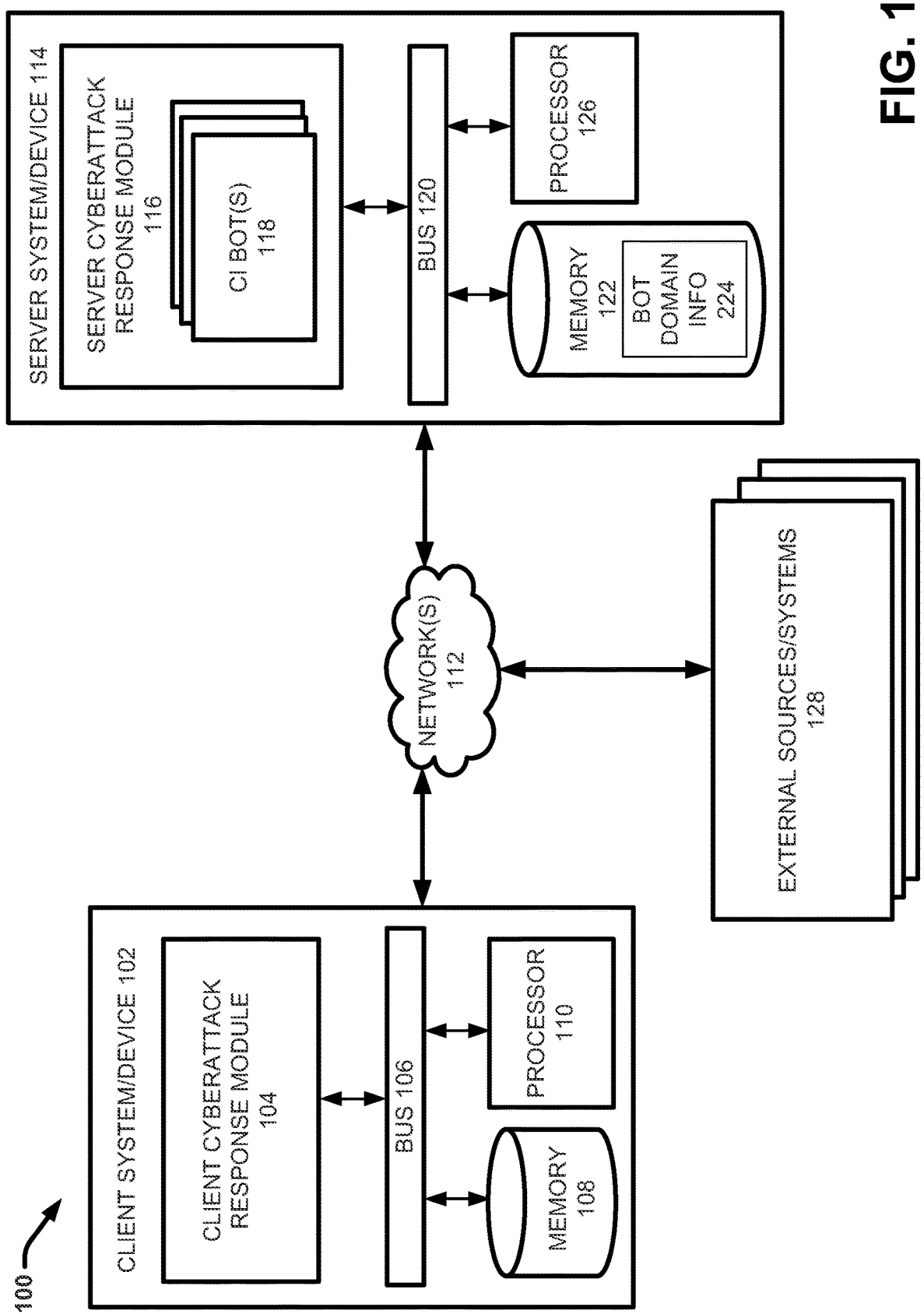
FIG. 1 illustrates an example system that facilitates responding to cyberattacks using counter intelligence (CI) bot technology in accordance with one or more embodiments described herein.

The following detailed description is merely illustrative and is not intended to limit embodiments and/or application or uses of embodiments. Furthermore, there is no intention to be bound by any expressed or implied information presented in the preceding Background section or in the Detailed Description section.

One or more embodiments described herein provide systems, computer-implemented methods, apparatus and/or computer program products that facilitate responding to cyberattacks using counter intelligence CI bot technology. A bot, (also known as web robot, web robot or an Internet bot, and the like), is a software application that runs automated tasks (e.g., scripts) over the Internet. Some bots are malicious in nature and have been employed to launch automated cyberattacks. Malicious bots, often referred to as botnets, have gained increasing attention in the cybersecurity arena due to their ability to relatively easily interface with and attack unsecured IoT devices. Malicious bots are defined as self-propagating malware that infects its host and connects back to a central server(s). The server functions as a command and control center for a botnet, or a network of compromised computers and similar devices. Malicious bots have been used to perform various types of cyberattacks, including but not limited to cyberattacks that are directed to: gathering passwords, logging keystrokes, obtaining financial information, relaying spam, capturing and analyzing packets, launch denial of service (DoS) attacks, opening back doors on infected computers, exploiting back doors opened by viruses and worms, and the like.

The disclosed techniques are directed to employing bot technology for the good to combat malicious cyberattacks, including those performed by botnets. In this regard, one or more CI bots can be developed that are respectfully tailored to handle a particular type of cyberattack. These CI bots can be stored at a CI response server (e.g., a cloud based server) that can be accessed by client devices/systems (e.g., IoT devices/systems) via one or more networks. When a client system detects a potential cyberattack of a particular type, the client system can access and employ the corresponding CI bot as provided by the CI response server to combat the cyberattack. Unlike traditional cybersecurity techniques that are deployed at a client system and designed to immediately stop the malicious attacker from accessing the client system and/or shut the client system down in response to detection of a cyberattack, the subject CI bots can be configured to become the good man-in-the middle to intercept and diverge the suspicious traffic so the client system can continue normal operation while the CI bot works to gather enough "intelligence" for a counter-attack. In this regard, the CI bot can be referred to as a "counter intelligence" bot because not only can the CI bot be designed to combat a specific type of cyberattack, the CI bot can further be configured to gather intelligence information about the malicious attacker (e.g., a botnet), including information about how the malicious attacker operates. Once the CI bot has gathered enough intelligence, the CI bot can further be configured to respond to the cyberattack with an appropriate response, such as directing the client system to shut down, change its access settings, and the like. After the CI bot has completed its response to the cyberattack, the CI bot can end or otherwise disable its connection with the client system and feed the intelligence information gathered during the session back to the CI response server. Because the CI bot is mission-based and short-lived, it cannot become a victim that could be taken over by the malicious attacker. The CI response server can further employ the gathered intelligence information to adapt and optimize the tactics of the specific CI bot using one or more machine learning techniques, thereby enabling effective counter attacks against future perpetrators as their tactics continue to evolve.

In one or more embodiments, a first system is provided that includes a processor and a memory that stores executable instructions that, when executed by the processor, facilitate performance of various operations. These operations can include receiving a request from a second system requesting assistance in association with a cyberattack on the second system, wherein the request comprises information indicating a type of the cyberattack, and selecting a counter intelligence bot configured to respond to the type of cyberattack. The operations can further include directing the counter intelligence bot to respond to the cyberattack, wherein the directing comprises enabling the counter intelligence bot to respond to the cyberattack by establishing a gateway with the second system and employing the gateway to intercept and respond to traffic associated with the cyberattack on behalf of the second system. In some implementations, the directing comprises enabling the counter intelligence bot to respond to the cyberattack by obtaining intelligence information regarding the cyberattack in association with the employing the gateway to intercept and respond to the traffic.

In another embodiment, another system is provided that includes a processor and a memory that stores executable instructions that, when executed by the processor, facilitate performance of various operations. These operations can include detecting a cyberattack on the system, and based on the detecting, sending a request to a cyberattack response system requesting assistance in association with responding to the cyberattack, wherein the request comprises information indicating a type of the cyberattack. The operations can further include, based on receiving the information indicating the type of cyberattack, establishing a gateway using a counter intelligence bot selected by, configured by, and received from the cyberattack response system, wherein the counter intelligence bot has been configured to respond to the cyberattack on behalf of the system. In various implementations, counter intelligence bot has been configured to respond to the cyberattack by employing the gateway to intercept and respond to traffic associated with the cyberattack.

In another embodiment, a machine-readable storage medium is provided. The machine-readable storage medium can include executable instructions that, when executed by a processor, facilitate performance of operations. These operations can include receiving a request from a system requesting assistance in association with a cyberattack on the system, wherein the request comprises information indicating a type of the cyberattack. These operations can further include selecting a counter intelligence bot configured to respond to the type of cyberattack comprising configuring the counter intelligence bot to respond to the cyberattack by establishing a gateway with the system and employing the gateway to intercept and respond to traffic associated with the cyberattack on behalf of the system, and directing the counter intelligence bot to respond to the cyberattack on behalf of the system comprising sending the counter intelligence bot to the system.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates an example system 100 that facilitates responding to cyberattacks using CI bot technology in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. The term "virtual" as used herein refers to a software implementation/embodiment of a physical computer or physical device/machine. A virtual machine (VM) can have an operating system, applications, files and the like. Central processing units (CPUs) can be added to or removed from a VM from time to time, or the VM can be relocated/migrated to another physical device.

System 100 includes a client system/device 102, a server system/device 114, and one or more external sources/systems 128. The server system/device 114 can be configured to provide cyberattack security services to client devices, such as the client system/device 102 via one or more networks 112 using the server cyberattack response module 116, as described in greater detail infra. It should be appreciated that a plurality of client devices can access and employ the cyberattack security services afforded by the server system/device 114 concurrently or simultaneously. The server system/device 114 can include any suitable computing device, including a physical device or VM. In some implementations, one or more features and functionalities of the server system/device 114 can be distributed across a plurality of communicatively coupled devices. In one implementations, the server system/device 114 can be part of a wireless communication service provider network, such as a cellular network service provider or the like. The server system/device 114 can include or be communicatively coupled to at least one memory 122 that stores computer-executable components (e.g., the server cyberattack response module 116). The server system/device 114 can also include or otherwise be associated with at least one processor 126 that executes the computer-executable components stored in the memory 122. The server system/device 114 can further include a system bus 120 that can couple the various components of the server system/device 114, but not limited to, the server cyberattack response module 116, the memory 122 and/or the processor 126. Examples of said processor 126 and memory 122, as well as other suitable computer or computing-based elements, can be found with reference to FIG. 10, and can be used in connection with implementing one or more of the systems or components shown and described in connection with FIG. 1 or other figures disclosed herein.

The client system/device 102 can include any suitable computing device configured to communicate with other systems/devices using one or more networks 112. example, the client system/device 102 can include various types of mobile and stationary computing devices, including but not limited to: a cellular phone, a smartphone, a tablet computer, a laptop computer, a desktop computer, an Internet enabled television, a wearable device, an augmented reality (AR) device, a virtual reality (VR) device, a heads-up display (HUD) device, and the like. In various exemplary embodiments, the client system/device 102 can be or include an IoT type device. The degree of sophistication of the IoT device can vary, from a basic sensor type household appliance to a self-driving vehicle and beyond. For example, client system/device 102 can include a metering device, implantable medical device (IMDs), a sensor and/or control device associated with home automation systems, a tracking devices, a point of sale device (e.g., vending, machines), a security device (e.g., associated with surveillance systems, homes security, access control, etc.), and the like.

As discussed in greater detail infra, the client system/device 102 can be configured with a client cyberattack response module 104 to facilitate accessing and employing the cybersecurity services provided by the server system/device 114. The client system/device 102 can further include or be communicatively coupled to at least one memory 108 that stores computer-executable components (e.g., the client cyberattack response module 104). The client system/device 102 can also include or otherwise be associated with at least one processor 110 that executes the computer-executable components stored in the memory 108. The client system/device 102 can further include a system bus 106 that can couple the various components of the client system/device 102, including but not limited to, the client cyberattack response module 104, the memory 108 and/or the processor 110. Examples of said processor 110 and memory 108, as well as other suitable computer or computing-based elements, can also be found with reference to FIG. 10, and can be used in connection with implementing one or more of the systems or components shown and described in connection with FIG. 1 or other figures disclosed herein.

The one or more external sources/systems 128 can include physical or virtual devices, machines, systems, networks (e.g., including cloud computing networks) and/or subnets that are external to the client system/device 102 and/or the server system/device yet capable of accessing the client system/device 102 and/or the server system/device 114 via one or more networks (e.g., the Internet). In accordance with various embodiments of the subject disclosure, the one or more external sources/systems 128 can include one or more traffic sources or entities responsible for a cyberattack. In this regard, the one or more external sources/systems 128 can be or include a device, a machine, a system, a network, network or subnet from which malicious traffic is received by the client system/device 102. For example, the one or more external sources/systems 128 can include a botnet, a source of malicious traffic that includes viruses, worms, and Trojan horses, and the like.

In the embodiment shown, the client system/device 102, the server system/device 114 and the one or more external sources/systems 128 can be connected via one or more networks 112. The one or more networks 112 can be or include a wide area network (WAN), e.g., the Internet), a LAN, a personal area network (PAN), or the like. In some embodiments, various components, devices or machines of system 100 can communicate using disparate networks. For example, the client system/device 102, the server system/device 114 and the one or more external sources/systems 128 can be configured to communicate with one another using various wireless communication technologies, including but not limited to: Universal Mobile Telecommunications System (UMTS) technologies, Long Term Evolution (LTE) technologies, advanced LTE technologies (including voice over LTE or VoLTE), Code Division Multiple Access (CDMA) technologies, Time Division Multiple Access (TDMA) technologies, Orthogonal Frequency Division Multiplexing (OFDN) technologies, Filter Bank Multicarrier (FBMC) technologies, Wireless Fidelity (Wi-Fi) technologies, Worldwide Interoperability for Microwave Access (WiMAX) technologies, General Packet Radio Service (GPRS) technologies, Enhanced GPRS, technologies, Third Generation Partnership Project (3GPP) technologies, Fourth Generation Partnership Project (4GPP) technologies, Fifth Generation Partnership Project (5GPP) technologies, Ultra Mobile Broadband (UMB) technologies, High Speed Packet Access (HSPA) technologies, Evolved High Speed Packet Access (HSPA+), High-Speed Downlink Packet Access (HSDPA) technologies, High-Speed Uplink Packet Access (HSUPA) technologies, ZIGBEE® technologies, or another IEEE 802.XX technology. Additionally, substantially all aspects disclosed herein can be exploited in legacy telecommunication technologies.

In various embodiments, server system/device 114 can be or include a cloud service provider. The term "cloud service provider" is used herein to refer to an organization, company, or group of organizations/companies that offers some component of "cloud computing," such as software as a service (SaaS), infrastructure as a service (IaaS), or platform as a service (PaaS) to other businesses or individuals. "Cloud computing" is a kind of network-based computing that provides shared processing resources and data to computers and other devices on-demand via a network (e.g., the one or more networks 112). It is a model for enabling ubiquitous, on-demand access to a shared pool of configurable computing resources (e.g., networks, servers, storage, applications and services), which can be rapidly provisioned and released with minimal management effort. Cloud computing and storage solutions provide users and enterprises with various capabilities to store and process their data in third-party data centers. In embodiments in which the server system/device 114 is or includes a cloud based server, the server system/device 114 can employ a private cloud network (e.g., based on OpenStack™ or VMware™ technology), a community cloud network, a public cloud network (e.g., Amazon Web Services™, Azure™, Google Cloud™, and the like), a hybrid cloud network, or the like.

As used herein, a cyberattack can refer to any type of offensive maneuver employed by an entity (e.g., individuals, groups, or organizations) that targets computer information systems, infrastructures, computer networks, and/or personal computer devices by various means of malicious acts originating from one or more network accessible sources (e.g., one or more external sources/systems 128) that either steals, alters, or destroys a specified target by hacking into a susceptible system. These can be labelled as either a cyber campaign, cyberwarfare or cyberterrorism in different contexts. A variety of different types of cyberattacks exist and are continually being developed. Some example types of cyberattacks that system 100 can facilitate counteracting can include but are not limited to: phishing attacks, drive-by attacks, malvertising attacks, DoS attacks, distributed DoD attacks (DDoS), man in the middle (MITM) attacks, brute force attacks, and macros attacks. These types of cyberattacks and others can be employ specific tactics to steal, alter or destroy a client system/device 102. For example, different types of cyberattacks can employ various tactics that are directed to gathering passwords, logging keystrokes, obtaining financial information, relaying spam, capturing and analyzing packets, disrupting service, opening back doors on infected computers, exploiting back doors opened by viruses and worms, and the like.

The server system/device 114 can include the server cyberattack response module 116 to facilitate providing cyberattack response measures to client devices/systems (e.g., client system/device 102) using one or more mission specific CI bots 118. In this regard, the one or more CI bots 118 can respectively include automated applications that are respectively configured to respond to a specific type of cyberattack using tactics that are tailored to the specific type of cyberattack, and using at least some information about the cyberattack provided the client device/system under attack. For example, the CI bots 118 can include but is not limited to, a CI bot configured to respond to phishing attacks, a CI bot configured to respond to drive-by attacks, a CI bot configured to respond to malvertising attacks, a CI bot configured to respond to DoS attacks, a CI bot configured to respond to DDoS, a CI bot configured to respond to MITM attacks, a CI bot configured to respond to brute force attacks, a CI bot configured to respond to macros attacks, and the like. It should be appreciated the CI bots described herein are merely exemplary and that system 100 is scalable to the development and application of CI bots that are specifically configured to respond to any type of cyberattack.

In accordance with various embodiments, the client system/device 102 can be configured to monitor and detect potential cyberattacks on the client device/system using the client cyberattack response module 104. When the client cyberattack response module 104 suspects that it may be under attach, instead of overloading the client system/device 102 by responding to the cyberattack, shutting the client system/device 102 down, or the like, the client cyberattack response module 104 can send a request to the server cyberattack response module 116 for assistance. The request can include information indicating or identifying the type of suspected cyberattack and request assistance for responding to the cyberattack. Based on reception of the request, the server cyberattack response module 116 can select a CI bot from the one or more CI bots 118 that is specifically configured to handle the type of cyberattack detected by the client cyberattack response module 104.

Once the appropriate CI bot has been selected the client cyberattack response module 104 can direct the selected CI bot (or an instance of the CI bot) to respond to the cyberattack by establishing a gateway with client system/device 102. In this regard, the CI bot can establish or set up a gateway or container with the client system/device 102. The process of establishing or setting up the gateway or container can involve the client system/device 102 and the CI bot establishing communication protocols/rules that define how the client system/device 102 and the CI bot will communicate and engage. In one or more embodiments, the communication protocols/rules can involve an agreement between the client system/device 102 and the CI bot wherein the client system/device 102 agrees to authorize the CI bot to act on behalf of the client device to intercept and respond to the suspicious traffic associated with the cyberattack. As a result, based on establishment of the gateway/container, the CI bot can employ the gateway/container to intercept and respond to the suspicious traffic on behalf of the client system/device 102. Meanwhile, the client system/device 102 can continue normal operations while the CI bot takes over responding to the cyberattack.

Because the CI bot has been configured to respond to the specific type of cyberattack, the CI bot will have the domain knowledge to appropriately respond to traffic requests associated with the cyberattack in a manner that does not harm or compromise the client system/device 102. In some implementations, the CI bot can further be configured to tailor its response to the client system/device 102 using information provided by the client system/device 102 to the CI bot in association with establishing the gateway/container. For example, in association with establishing the gateway/container, the client system/device 102 can provide the CI bot with any information the client system/device know about the cyberattack up until the point where the client system/device hands over control to the CI bot. Accordingly, the CI bot will have the domain knowledge regarding how to respond to the specific cyberattack as well as information specific to the current context of the cyberattack on the client system/device 102.

Unlike traditional cybersecurity techniques that are deployed at a client system/device 102 and designed to immediately stop the malicious attacker from accessing the client system/device 102 and/or shut the client system down in response to detection of a cyberattack, the subject CI bots can be configured to respond to the cyberattack by intercepting the associated traffic and providing pseudo responses to traffic requests associated with the cyberattack. In this regard, the CI bot can be configured to engage the cyber attacker and pretend to be the client system/device 102 for a period of time long enough to gather intelligence information about the cyberattack, including information about how the malicious attacker operates. Once the CI bot has gathered enough intelligence, the CI bot can further be configured to respond to the cyberattack with an appropriate response, such as directing the client system to shut down, change its access settings, and the like. After the CI bot has completed its response to the cyberattack, the CI bot can end or otherwise disable the gateway/container set up between the CI bot and the client system/device 102. As a result, the CI bot can end its mission or session with the client system/device 102 before the potential of being taken over by the malicious attacker arises.

The intelligence information gathered by the CI bot in association with responding to a cyberattack on behalf of the client system/device 102 is a key component in the continued success of future operations of the respective CI bots. In particular, because the cyberattack techniques and strategies are constantly evolving, the tactics employed by the respective CI bots 118 also need to evolve accordingly. Accordingly, each time (or in some implementation, one or more times), a CI bot responds to a type cyberattack that it is configured to respond to, the CI bot can gather intelligence information regarding techniques and strategies employed by the malicious attacker. The CI bot can further provide the gathered intelligence information to the server cyberattack response module 116 for continued optimization of the CI bot. For example, the intelligence information can be collected and collated over time and stored in memory accessible to the server cyberattack response module 116. In the embodiment shown, the gathered intelligence information is represented by the bot domain information 224. As described in greater detail infra, the server cyberattack response module 116 can further employ the bot domain information 224 to adapt and optimize the tactics of the specific CI bot using one or more machine learning techniques, thereby enabling effective counter attacks against future perpetrators as their tactics continue to evolve.

Figure 2:
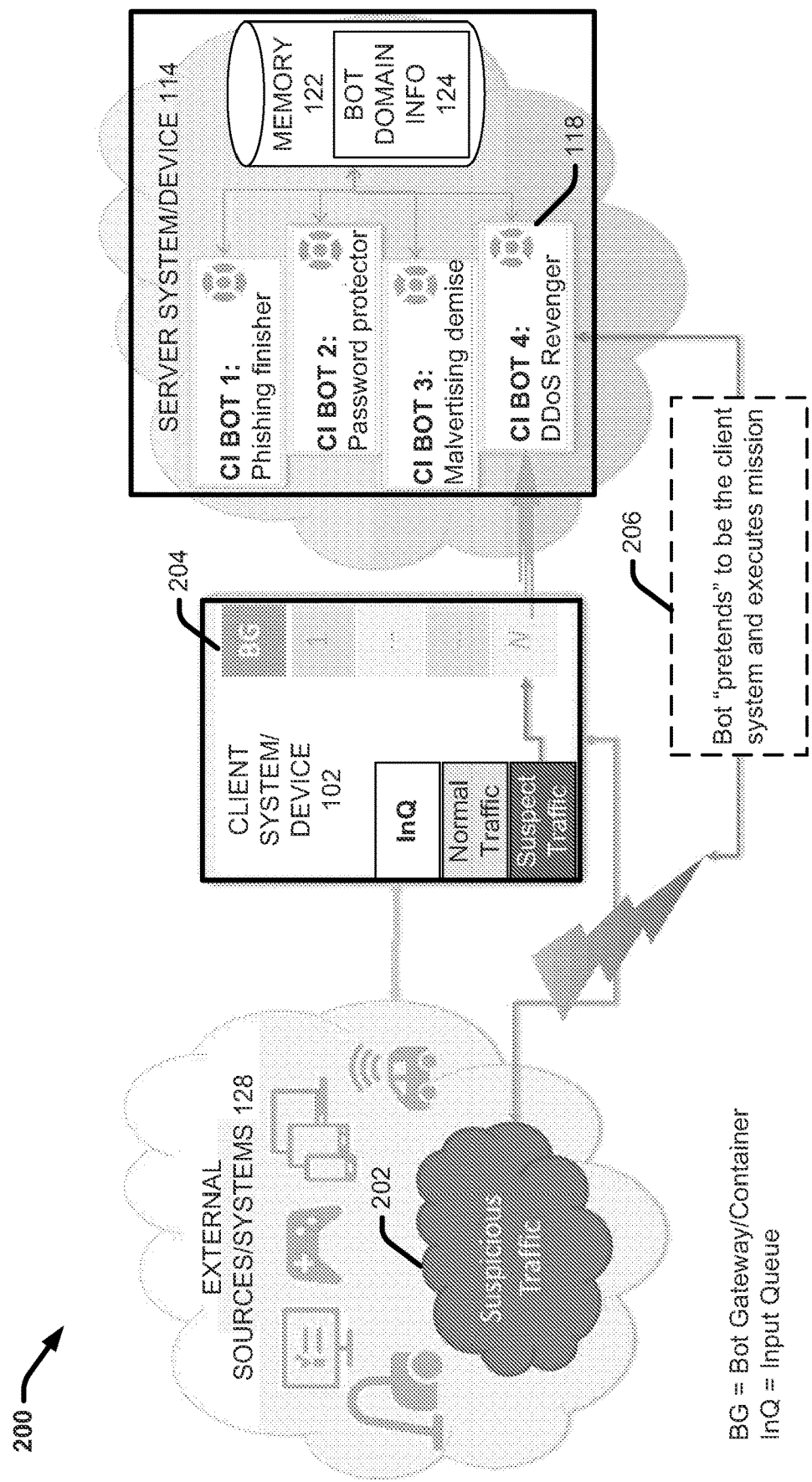
FIG. 2 illustrates another example system that facilitates responding to cyberattacks using CI bot technology in accordance with one or more embodiments described herein.

FIG. 2 illustrates another example system 200 that facilitates responding to cyberattacks using CI bot technology in accordance with one or more embodiments described herein. System 200 can include same or similar features and functionalities of system 100. System 200 provides some additional illustrative content that facilitates exemplifying some of the features and functionalities of system 100. Repetitive description of like elements employed in respective embodiments is omitted for sake of brevity.

In the embodiment shown, the server system/device 114 comprises a plurality of different mission specific CI bots 118, respectively identified as CI bot 1, CI bot 2, CI bot 3 and CI bot 4. The respective CI bots can be considered mission because they can be configured to combat a specific type of cyberattack by performing one or more automated tasks that have been tailored based on the specific type of cyberattack. For example, CI bot 1 can be configured to combat phishing attacks, CI bot 2 can be configured to combat attacks designed to retrieve passwords, CI bot 3 can be configured to combat malvertising attacks, and CI bot 4 can be configured to combat DDoS attacks. It should be appreciated that although four CI bots are depicted, the architecture of system 200 and other systems described herein (e.g., system 100 and the like) allows for any number N of mission specific CI bots. For example, new mission specific bots can be developed as new types of cyberattacks arise. These mission specific CI bots can be invoked by a client system/device 102 ad-hoc to handle a live cyberattack. For example, in the embodiment shown, the client system/device 102 is engaging with CI bot 4, the "DDoS revenger."

Although the CI bots are depicted as being stored at a cloud based server, it should be appreciated the CI bot can be located at any network accessible location. Further, a single mission specific CI bot can be employed by a plurality of clients at the same time (e.g., several clients can employ a mission specific CI bot 118 simultaneously). In this regard, the server system/device 114 can be configured to assign and/or direct a CI bot to respond cyberattacks occurring at several different network accessible client devices. Each assignment can result in establishment of a session or mission between the client and the CI bot, and wherein each session or mission can be tailored to the respective client devices. For example, in some implementations, an instance or copy of the CI bot can be generated and employed for each client to perform a mission specific operation tailored to that client for responding to a cyberattack on that client. In this regard, each instance of the CI bot will run on its own mission that is mutually exclusive from the missions of other instances of the same CI bot. The only commonalties between each instance are that they are respectively configured to respond to the same type of cyberattack using the same domain knowledge about that type of cyberattack and that they are respectively configured to end their missions by reporting gathered intelligence back to the server for collation with the CI bot domain information 224. Accordingly, in one or more implementations, a CI bot can set up a VM for each new client/mission and shut down the VM once the mission is complete. Two or more VM or instances of the CI bot could thus start up and run for two or more clients at the same time. This could multiply to the extent of computing resources available on the platform.

In one or more embodiments, the client system/device 102 can monitor traffic received from various external sources/systems 128 via one or more networks (e.g., the Internet). For example, in the embodiment shows, these external sources/systems can include other client type devices (e.g., smartphones, tablets, desktop computers, gaming devices, etc.), IoT devices (e.g., a smart car, a connected household appliance, etc.), and the like. These external sources and systems can also include various other types of real or virtual computing devices, systems, networks (e.g., a botnet), and the like. In response to detection of a suspicious traffic 202 that is or could be associated with a cyberattack, the client system/device 102 can send a request to the server system/device 114 for an appropriate CI bot that has been configured to respond to the type of cyberattack associated with the suspicious traffic 202. For example, in response to detection of suspicious traffic 202 that is or may be associated with a botnet DDoS attack, the client system/device 102 can send a request to the server system/device 114 for a CI bot configured to handle botnet DDoS attacks. In some implementations, the client system/device 102 can determine the type of cyberattack based on information associated with the suspicious traffic 202, such as but not limited to: an internet protocol (IP) address (or addresses) from which the suspicious was received, formatting of the traffic, types of requests associated with the traffic, registration, and the like. With these implementations, the request can include information identifying the detected type of cyberattack. In other implementations, the client system/device 102 can provide the server system/device 114 with information the client system/device 102 knows about the cyberattack (e.g., the IP address, the registration, etc.), and the server system/device 114 can determine the type of cyberattack based on the received information.

Based on reception of the request, the server system/device can further select the appropriate CI bot configured to handle the type of detected cyberattack on the client system/device 102 and direct the CI bot to initiate a mission or session with the client system/device 102 to respond to the cyberattack. This can involve directing the CI bot to engage with the client system/device 102 and set up the bot gateway/container 204. For example, the bot gateway/container 204 can correspond to a communication link between the client system/device 102 and the CI bot that is associated with a defined set of communication rules/protocols agreed to between both the client system/device 102 and the CI bot that defines how they will communicate and engage or otherwise interface with one another to carry out the mission. In one or more embodiments, in association with setting up the bot gateway/container 204, the client system/device 102 can be configured to authorize the CI bot to act on behalf of the client system/device 102 and respond to the suspicious traffic 202 on behalf of the client system/device 102. Accordingly, in association with setting up the bot gateway/container 204, the client system/device 102 can agree to forward the received suspicious traffic 202 to the CI bot using the bot gateway/container 204. In this regard, the bot gateway/container 204 can be employed by the client system/device 102 and the CI bot as a channel that routes the suspicious traffic to the CI bot. The CI bot can further be configured to act as if it is the client system and continue to collect information from the attacker and carry out its mission until the point where the CI bot is confident to invoke a counter-attack or counter-response. For example, in the embodiment shown, at 206, the CI bot pretends to be the client system/device 102 and executes the mission that it has been configured to perform.

The specific tactics and operations performed by the CI bot that constitute its mission can vary depending on the type of cyberattack and the context of the current cyberattack. In various embodiments, the respective CI bots 118 provided by the server system/device 114 can be configured to resemble a Special Weapons and Tactics (SWAT) team, wherein the mission of the respective CI bots follows a plan of engaging the enemy, interrogating the enemy, executing a counter-response, and reporting information learned about the enemy via the mission (e.g., the enemy's tactics) to a central intelligence officer. In this regard, the CI bots 118 can respectively be trained to respond to a specific type of cyberattack, become briefed on the current context of the cyberattack at hand (e.g., receive and/or determine information about the current context of the cyberattack at the client), employ domain knowledge regarding how to handle the specific type of cyberattack, gather intelligence information about the cyber attacker, execute a counter response to the cyberattack (e.g., by shutting the client system/device 102 down or another appropriate response), and then leave the client system/device 102 or otherwise disable the bot gateway/container 204 with the client system/device 102 and report the gathered intelligence information back to the server system/device 114. Because the CI bot does not remain active at the client system/device 102 after the mission is complete, the CI bot cannot become hijacked by the attacking entity (e.g., a botnet) and used against the client system/device 102. The server system/device 114 can further employ the gathered intelligence information (depicted in system 200 as bot domain information 124) to update or adapt the tactics of the mission specific CI bots accordingly using one or more machine learning techniques (as described in greater detail infra with reference to the bot optimization component 308).

Figure 3:
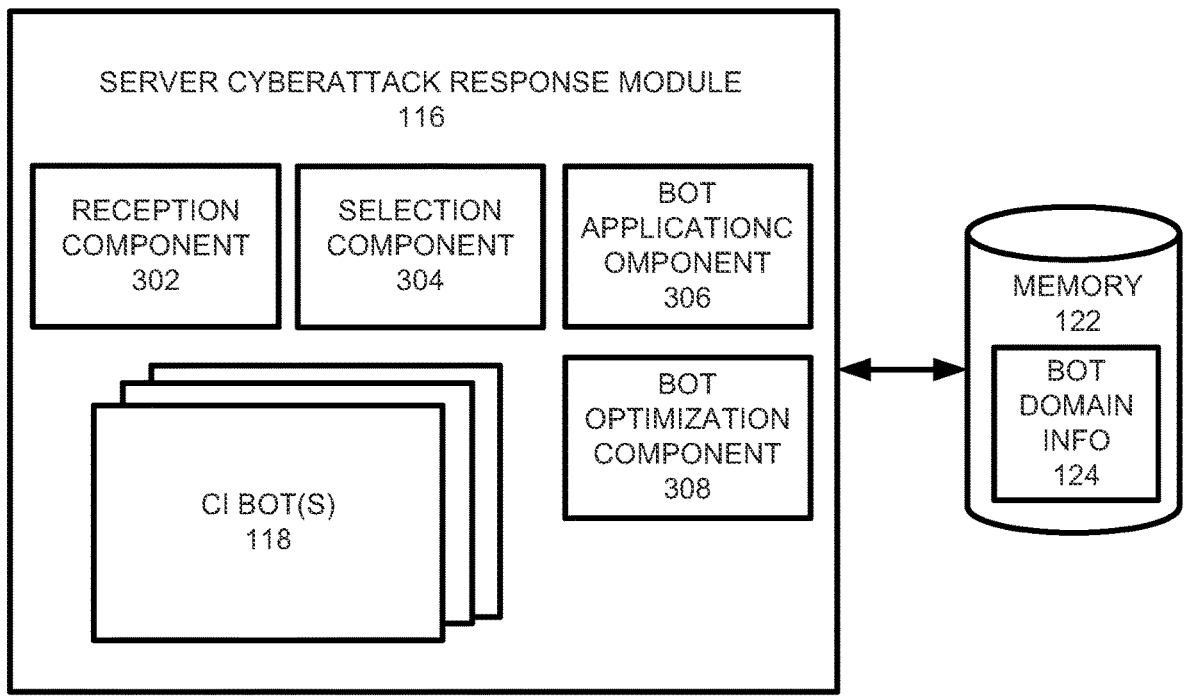
FIG. 3 illustrates an example server cyberattack response module in accordance with one or more embodiments described herein.

FIG. 3 illustrates an example server cyberattack response module 116 in accordance with one or more embodiments described herein. In the embodiments shown, in addition to the one or more CI bots 118, the server cyberattack response module 116 can include reception component 302, selection component 304, bot application component 306 and bot optimization component 308. Repetitive description of like elements employed in respective embodiments is omitted for sake of brevity.

In one or more embodiments, the reception component 302 can be configured to receive requests from client system/devices (e.g., client system/device 102) that request assistance in association with a detected cyberattack or possible cyberattack on the client system/device. In some implementations, the request can include information identifying or indicating the type of cyberattack detected at the client system/device. For example, the request can include information identifying the type of cyberattack as determined by the client system/device 102 (e.g., based on an IP address (or addresses) from which the suspicious was received, formatting of the traffic, types of requests associated with the traffic, registration, and the like). In another example, the request can include information gathered by the client system/device about the suspicious traffic (e.g., an IP address (or addresses) from which the suspicious was received, formatting of the traffic, types of requests associated with the traffic, registration, and the like), that can be used by the server cyberattack response module 116 to determine the type of cyberattack on the client system/device 102. The request can also include information that identifies the client system/device 102 and facilitates establishing the bot gateway/container 204 between the client system/device 102 and the selected CI bot for responding to the cyberattack.

In another embodiment, the reception component 302 can be configured to monitor traffic received at the client system/device. With this embodiment, the reception component 302 can determine if and when suspicious traffic associated with a cyberattack on the client system/device is received. In this regard, the server cyberattack response module 116 can respond immediately without having the client system/device ask for assistance. For example, based on detection, by the reception component 302, of a cyberattack on a client system/device 10, the server cyberattack response module 116 can respond by immediately selecting and send out the appropriate CI bot for help.

The selection component 304 can be configured to select the appropriate CI bot for responding to a cyberattack on the client system/device 102 based on the type of cyberattack detected at the client system/device. In this regard, the respective CI bots 118 can be configured to handle different types of cyberattacks and the selection component 304 can be configured to select a CI bot from a set of available CI bots that is specifically configured to respond to the type of cyberattack detected at the client system/device 102. For example, the respective CI bots can be associated with information that identifies the type of cyberattack the CI bots are configured to respond to. In some implementation, the selection component 304 can determine or infer an appropriate CI bot to send to a client system/device 102 based one or more characteristics of the suspicious traffic as reported by the client system/device 102 and learned information (e.g., bot domain information 124) associated with the respective CI bots regarding one or more characteristics of traffic that the CI bots are configured to respond to. In this regard, the selection component 304 can employ one or more machine learning techniques to match a particular cyberattack at a particular type of client device with the most appropriate CI bot.

Once an appropriate CI bot of the one or more CI bots 118 has been selected, the bot application component 306 can be configured to direct the CI bot to respond to the cyberattack occurring at the client system/device 102. This can involve for example, enabling the CI bot to respond to the cyberattack by establishing a gateway (e.g., bot gateway/container 204) with the client system/device 102 and instructing and/or enabling the CI bot to employ the gateway to intercept and respond to traffic associated with the cyberattack on behalf of the client system/device 102. Based on directing the CI bot to respond to the cyberattack on the client system/device 102, the CI bot can be configured to establish the gateway with the client system/device 102 and employ the gateway to respond to the cyberattack as the CI bot is programmed to respond. The tactics employed by the CI bot can vary depending on the type of cyberattack and the type of client system/device 102 at which the cyberattack is occurring. In various embodiments, the CI bot can be configured to respond to the cyberattack by intercepting the suspicious traffic directed to the client system/device 102 by the attacking entity and responding to the suspicious traffic with pseudo responses on behalf of the client system/device 102. For example, the pseudo response can include inaccurate information that appears to the attacker as if it is coming from the client system/device 102. The CI bot can thus be configured to interact with and respond to the cyberattack in a manner that does not harm or compromise the client system/device 102. Further, while the CI bot is responding to the cyberattack, the client system/device 102 can continue normal operations.

In various embodiments, the CI bots 118 can be configured to intercept the suspicious traffic and respond to the suspicious traffic on behalf of the client system/device 102 for a period of time that allows for the CI bot to gather intelligence information about the cyberattack. For example, the intelligence information can include information regarding the source of the suspicious traffic, characteristics of the traffic, and tactics employed by the attacking entity. The period of time can vary depending on the context of the cyberattack. For example, the period of time can vary depending on the type of cyberattack, the type of client system/device 102 at which the cyberattack is occurring, and/or the amount of intelligence information gathered. For instance, in some implementations, the period of time can be fixed based on the type of cyberattack and/or the type of client system/device 102. In other implementations, the amount or type of intelligence information to be gathered can be predefined. With these implementations, the CI bot can continue to engage the cyber attack until the amount or type of intelligence information is gathered. Still in other implementations, the period of time can be based on the occurrence of a trigger event. For example, the trigger event can include reception of a particular type of request received from the attacking entity, a sequence of requests, a number of requests, a number of repeated requests and the like.

The CI bots 118 can further be configured to execute a response to counter the cyberattack and the mission after the period of time expires. For example, a CI bot (e.g., one of the CI bots 118) can be configured to execute a response to the cyberattack after a predefined period of time (e.g., predefined based on the type of cyberattack, predefined based on a type of the client system/device 102, and the like) expires. In another example implementation, the CI bot can be configured to execute the counter response after a defined amount or type of intelligence information has been gathered. In another implementation, the CI bot can be configured to execute the counter response in response to detection of a trigger event.

The counter response can include for example, a measure that facilitates stopping the cyberattack or preventing the cyber attacker from harming the client system/device. For example, the counter response can include but is not limited to: directing the client system/device 102 to shut down (e.g., by powering down, or the like), directing the client system/device 102 to enter into a safe mode (e.g., a mode designed to prevent the cyberattack from accessing or harming the client system/device while allowing the client system/device to maintain at least some active operations), directing the client system/device 102 to change its access or security settings (e.g., passwords, access codes, etc.), directing the client system/device 102 to initiate an alarm, directing the client system/device 102 to notify an entity responsible for managing the security associated with the client system/device 102 (e.g., a user of the client system/device 102, a service provider for the client system/device 102) and the like. In some implementations, a CI bot 118 can be configured to continue to respond to the cyberattack on behalf of the client system/device until a defined counter response has been carried out. For example, in one implementation in which the counter response comprises directing the client system/device 102 to contact the service provider to effectuate changing security access parameters, the CI bot can be configured to response to the cyberattack on behalf of the client system/device until the CI bot receives notification from the client system/device 102 that the service provider has been contacted and the security access parameters have been changed.

The counter response executed by a CI bot can also vary depending on the type of cyberattack and/or the type of client system/device at which the cyberattack is occurring. For example, if the client system/device 102 is an IMD that is configured to provide critical medical treatment to a patient in which the IMD is implanted (e.g., maintaining organ function by supplying medical treatment), shutting down the IMD in response to a cyberattack could be inappropriate and even life threatening. On the other hand, depending on the function of the IMD, and the type of the cyberattack (e.g., monitoring one or more vital signs), it may be appropriate to temporarily shut down the IMD. Likewise, a counter response directed to an IoT type or kitchen appliance (e.g., a smart toaster), could be conceivably much different than a counter response that is appropriate for a self-driving vehicle or a home security system. In this regard, in some implementations, the type of counter response executed by a CI bot can vary based on a risk level associated with the client system/device 102 and/or a risk level associated with executing the counter response in relation to allowing the cyberattacked to affect the client system/device 102.

Once the CI bot has completed its mission by gaining intelligence information about the cyberattack and executing an appropriate counter response, the CI bot can be configured to disable the bot gateway and end its connection to the client system/device 102. The CI bot can further be configured to report the gathered intelligence information to the server system/device 114 where it can be collated over time with other gathered intelligence information for same or similar missions (e.g., performed by the same CI bot) as bot domain information 224.

The bot optimization component 308 can be configured to employ the collated bot domain information 124 to adapt and optimize the operations of the respective CI bot using one or more machine learning techniques. For example, with respect to a CI bot configured to respond to DDoS attacks, the bot optimization component 308 can be configured to evaluate intelligence information gathered by the CI bot in association with responding to DDoS attacks for a plurality of client devices. The bot optimization component 308 can further adapt one or more tactics of the CI bot to optimize the manner in which it responds to future DDoS attacks based on learned patterns found in the intelligence information. As a result, the respective CI bot that are configured to respond to specific types of cyberattacks can continuously be updated to respond to changes in the tactics employed for the respective types of cyberattacks. Further, in some implementations, the bot optimization component 308 can identify new types of cyberattacks based on the gathered intelligence information and facilitate generating new CI bots that are specifically tailored to combat the new types of cyberattacks.

The type of machine learning techniques used by the bot optimization component 308 to determine or infer updates to the CI bots 118 and/or generate new CI bots based on the collated bot domain information 124 can vary. Machine learning is a type of artificial intelligence (AI) that provides computers with the ability to learn without being explicitly programmed. Machine learning focuses on the development of computer programs (e.g., the subject CI bots 118 and new CI bots) that can change when exposed to new data. Machine learning techniques use that compiled data to detect patterns in the data and adjust program actions accordingly. In some implementations, the machine learning algorithms employed by the bot optimization component 308 can include supervised algorithms. Supervised algorithms can apply what has been learned in the past to new data. In other implementations, the machine learning algorithms employed by the bot optimization component 308 can include unsupervised algorithms. Unsupervised algorithms can draw inferences from datasets. Still in other implementations, the bot optimization component 308 can employ a combination of supervised and unsupervised machine learning, referred to herein as semi-supervised learning. With semi-supervised machine learning, the collated bot domain information 124 can be vetted or filtered by an automated filtering system or one or more authorized (human) experts to eliminate any manipulative training data before being employed by the bot optimization component 308 to determine or infer updates to the CI bots and/or to determine or infer new types of cyberattacks (for which new CI bots can be generated).

In some embodiments, the machine learning techniques employed by the bot optimization component 308 can involve deep learning. Deep learning is an aspect of AI that is concerned with emulating the learning approach that human beings use to gain certain types of knowledge. At its simplest, deep learning can be thought of as a way to automate predictive analytics. While traditional machine learning algorithms are linear, deep learning algorithms are stacked in a hierarchy of increasing complexity and abstraction. Each algorithm in the hierarchy applies a non-linear transformation on its input and uses what it learns to create a statistical model as output. Iterations continue until the output has reached an acceptable level of accuracy. The number of processing layers through which data must pass is what inspired the label "deep."

In order to provide for or aid in the numerous inferences described herein, the bot optimization component 308 can examine the entirety or a subset of the data to which it is granted access and can provide for reasoning regarding updates to the operations of the CI bots 118 and newly identifying types of cyberattacks and associated tactics for new CI bots to be generated that can combat the new types of cyberattacks. This data can include the bot domain information 124 as well as information provided by the client system/device 102 (e.g., in association with an assistance requests), and other relevant information provided at various external sources and systems. In some embodiments, in addition to intelligence information reported by the CI bots 118 following a mission, the bot domain information 124 can also include learned patterns from recent publicly known cyberattacks. In this regard, the bot optimization component 308 can receive or access information provided by one or more external sources and systems regarding publicly known cyberattacks that were not affiliated with system 100 (or other systems described herein).

An inference can be employed to identify a specific context or action, or can generate a probability distribution over states, for example. The inference can be probabilistic (e.g., the computation of a probability distribution over states of interest can be based on a consideration of data and events). An inference can also refer to techniques employed for composing higher-level events from a set of events and/or data. Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x4, x4, xn), to a confidence that the input belongs to a class, such as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 4:
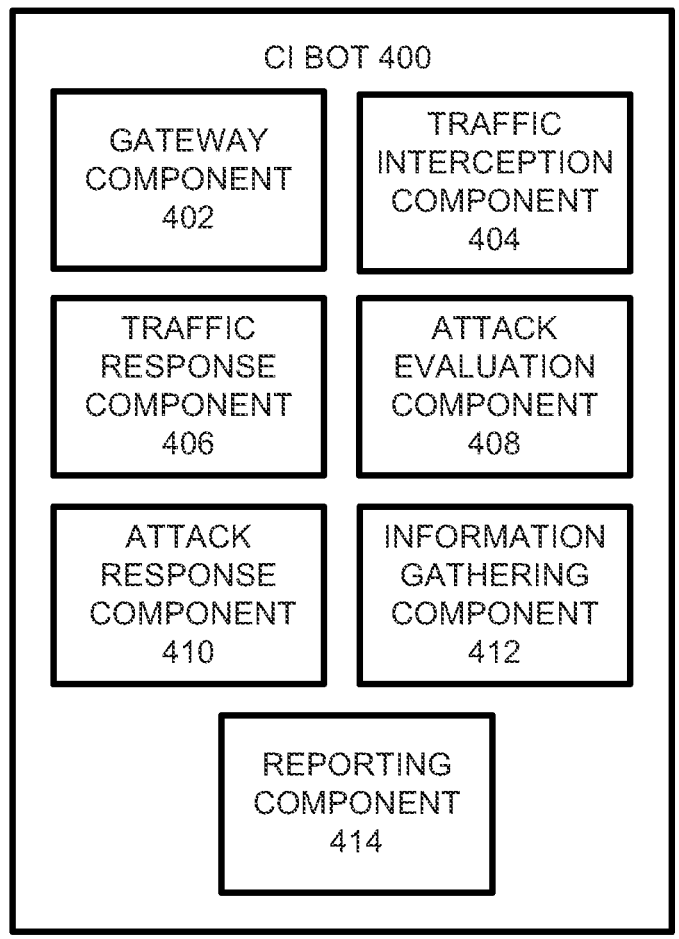
FIG. 4 presents an example CI bot in accordance with one or more embodiments described herein.

FIG. 4 presents an example CI bot 400 bot in accordance with one or more embodiments described herein. Repetitive description of like elements employed in respective embodiments is omitted for sake of brevity.

CI bot 400 presents one example embodiment of a mission specific CI bot that can be configured to respond to a specific type of cyberattack. CI bot can include same or similar features and functionalities as the one or more CI bots 118 and vice versa. In the embodiments shown, the example CI bot 400 can include a gateway component 402, a traffic interception component 404, a traffic response component 406, an attack evaluation component 408, an attack response component 410, an information gathering component 412 and a reporting component 414. The gateway component 402 can be configured to facilitate establishing or setting up the bot gateway (e.g., the bot gateway/container 204) with the client system/device 102 in association with respond to a cyberattack on the client system/device 102. As described supra, this can involve establishing one or more rules or protocols defining how the CI bot 400 and the client system/device 102 will communicate and interact. In various embodiments, the rules or protocols can instruct the client system/device 102 to forward suspicious traffic received in association with the cyberattack to the CI bot 400 and authorize the CI bot to respond to the traffic on behalf of the client system/device.

The traffic interception component 404 can be configured to employ the established gateway to intercept incoming suspicious traffic directed for the attacking entity to the client system/device 102. The traffic response component 406 can be configured to respond to the incoming suspicious traffic on behalf of the client system/device. For example, the traffic response component 406 can be configured to generate and provide the attacking entity with pseudo responses to requests received from the attacking entity. For example, the pseudo responses can include inaccurate information or confirmation of performance of one or more operations that were in fact not performed be the client system/device. The traffic response component 406 can thus be configured to respond to the attacking entity using defined tactics that are tailored to the type of cyberattack. These tactics can be programmed into the traffic response component 406.

The attack evaluation component 408 can be configured to monitor the progress of the cyberattack to determine when to issue a counter response to the cyberattack and end the mission. In this regard, the attack evaluation component 408 can determine when a trigger event occurs, when a defined period of time has passed, when enough intelligence information has been gathered and the like. Accordingly, the attack evaluation component 408 can be likened to the leader of the SWAT team that determines what actions the SWAT team performs and when.

The attack response component 410 can be configured to determine the appropriate counter response to a cyberattack (e.g., based on the context of the cyberattack, including the type of cyberattack and the type of client system/device 102). The attack response component 410 can further issue the respond by directing (e.g., using the gateway) the client system/device 102 to execute the counter response. The timing of issuing of the response can be monitored and determined by the attack evaluation component 408.

The information gathering component 412 can be configured to gather intelligence information over the course of the mission regarding the cyberattack, including any information that can be learned about the attacking entity, including tactics employed by the attacking entity in association with launching of the cyberattack on the client system/device 102. The reporting component 414 can further be configured to report or otherwise provide the gathered intelligence information to the server system/device for addition to the collated bot domain information 124 upon completion of the mission.

Figure 5:
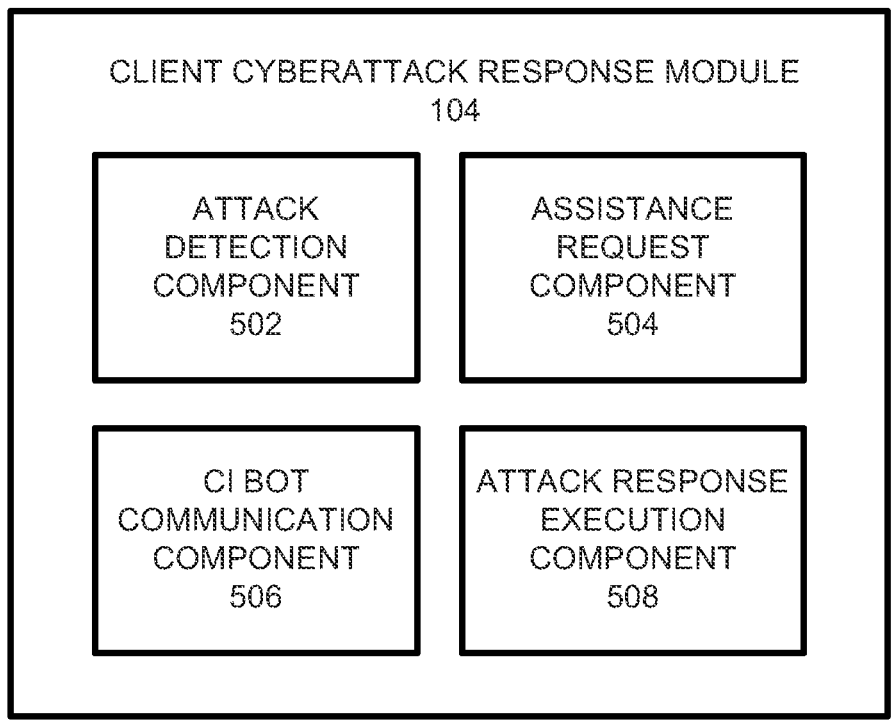
FIG. 5 illustrates an example client cyberattack response module in accordance with one or more embodiments described herein.

FIG. 5 illustrates an example client cyberattack response module 104 in accordance with one or more embodiments described herein. In the embodiments shown, the client cyberattack response module 104 can include attack detection component 502, assistance request component 504, CI bot communication component 506, and attack response execution component 508. Repetitive description of like elements employed in respective embodiments is omitted for sake of brevity.

In one or more embodiments, the attack detection component 502 can be configured to monitor traffic received by the client system/device 102 to identify suspicious traffic that is or may be associated with a cyberattack. For example, the attack detection component 502 can identify suspicious traffic that is or may be associated with a cyberattack based on an IP address (or addresses) from which the suspicious was received, formatting of the traffic, types of requests associated with the traffic, registration, and the like. In some implementations, the attack detection component 502 can determine a type of the cyberattack based on information associated with the suspicious traffic (e.g., the IP address (or addresses) from which the suspicious was received, the type of device from which the traffic was received, formatting of the traffic, types of requests associated with the traffic, frequency of the requests, similarity of the requests, registration, and the like).

Based on detection of suspicious traffic that is or may be associated with a cyberattack, the assistance request component 504 can generate and send a request to the server system/device 114 requesting assistance in responding to the cyberattack. The assistance request can include information indicating or identifying the type of cyberattack. The CI bot communication component 506 can be configured to facilitate establishing a gateway (e.g., bot gateway/container 204) with a CI bot selected by, configured by and provided by the server cyberattack response module 116 in response to reception of the assistance request. For example, the CI bot communication component 506 can establish communication rules/protocols for communicating with the CI bot and grant the CI bot authority to intercept and respond to the suspicious traffic on behalf of the client system/device 102.

The CI bot communication component 506 can further employ the gateway to forward the CI bot received suspicious traffic in association with the cyberattack. The CI bot communication component 506 can also employ the gateway to receive communications from the CI bot, including counter response information determined and/or provided by the CI bot. The attack response execution component 508 can be configured to execute a counter response issued by the CI bot via the gateway in association with combating the cyberattack. For example, counter response can include an order to shut the client system/device down, an order to change access/security settings, an order to notify an entity responsible for the security of the client system/device 102 regarding the current cyberattack, and the like. Based on reception of the order from the CI bot, the attack response execution component 508 can respond accordingly (e.g., by shutting the client system/device down, or the like).

Figure 6:
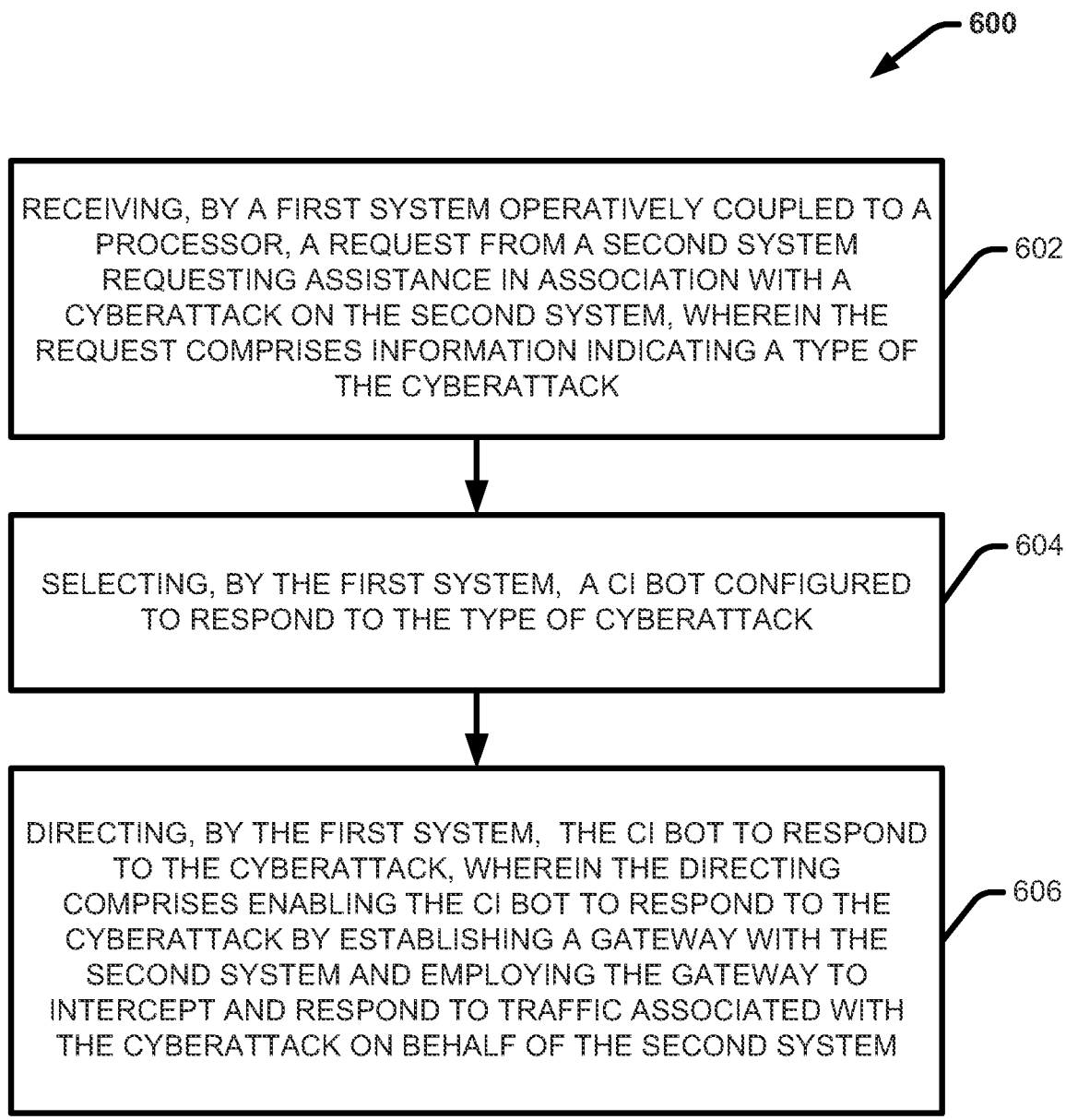
FIG. 6 presents a flow diagram of an example computer implemented method for responding to cyberattacks using CI bot technology in accordance with one or more embodiments described herein.
Figure 7:
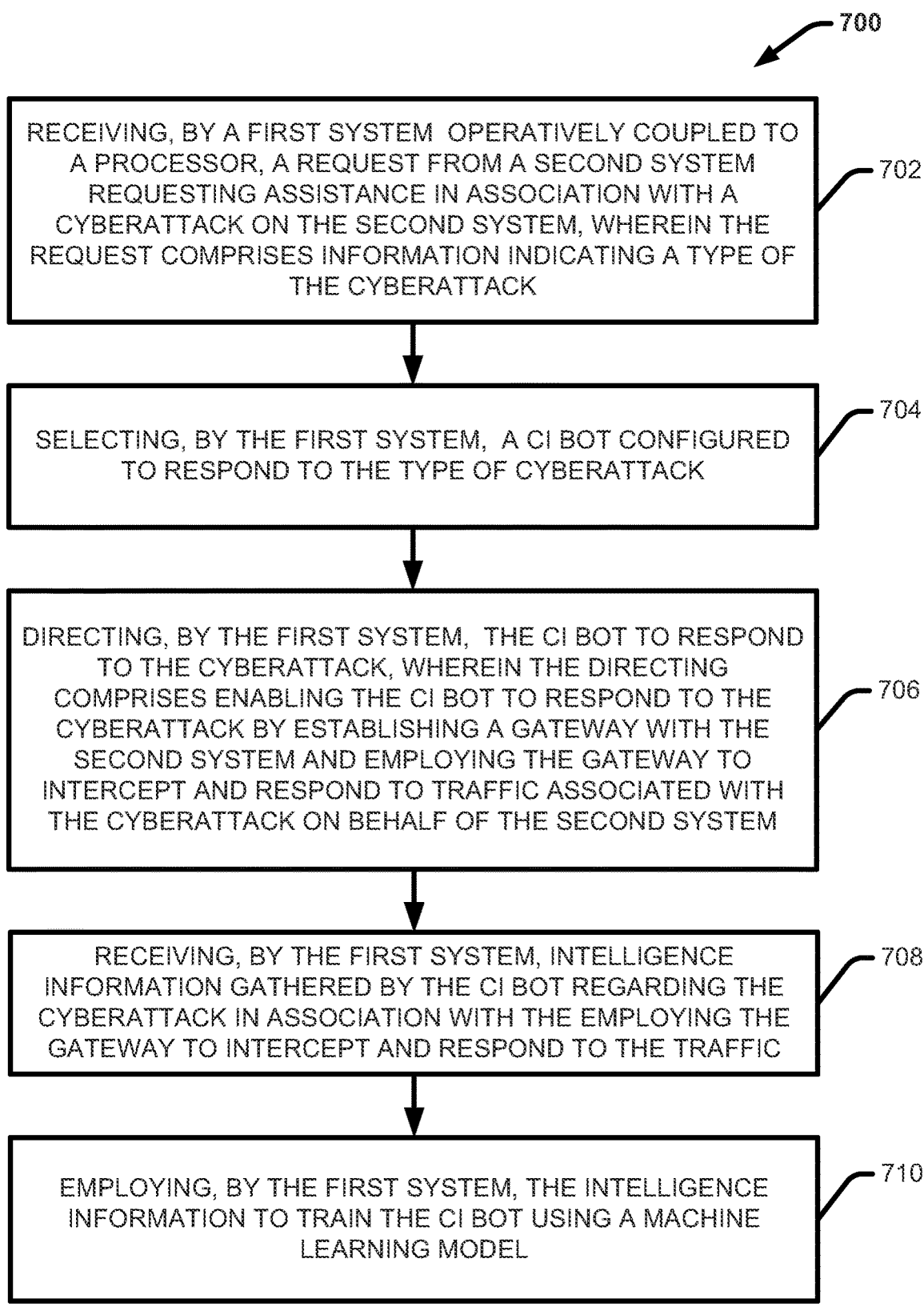
FIG. 7 presents a flow diagram of an example computer implemented method for responding to cyberattacks using CI bot technology in accordance with one or more embodiments described herein.
Figure 8:
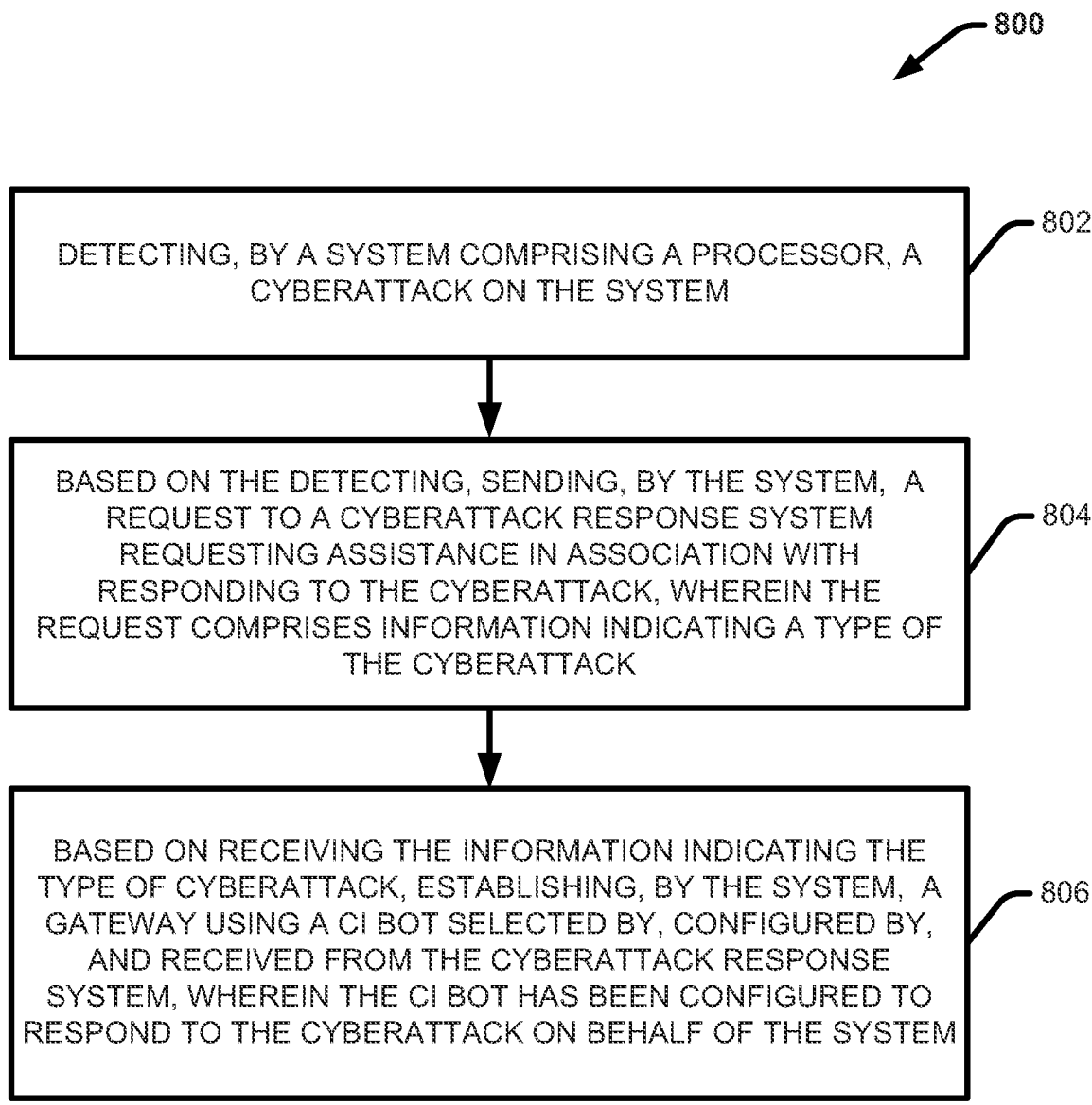
FIG. 8 presents a flow diagram of an example computer implemented method for responding to cyberattacks using CI bot technology in accordance with one or more embodiments described herein.

FIGS. 6-8 illustrate flow diagrams of example, non-limiting methods that facilitate telemetry data communication security between an implantable device and an external device in accordance with one or more embodiments described herein. While, for purposes of simplicity of explanation, the methodologies are shown and described as a series of acts, the disclosed subject matter is not limited by the order of acts, as some acts can occur in different orders and/or concurrently with other acts from that shown and described herein. For example, those skilled in the art will understand and appreciate that a methodology can alternatively be represented as a series of interrelated statuses or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices. The following methods facilitate enhanced assessing risk associated with firewall rules.

Referring now to FIG. 6, shown is a flow diagram of an example method 600 for responding to cyberattacks using CI bot technology in accordance with one or more embodiments described herein. Repetitive description of like elements employed in other embodiments described herein is omitted for sake of brevity.

At 602, a first system receiving, by a first system operatively coupled to a processor (e.g., server system/device 114), receives (e.g., via reception component 302) a request from a second system (e.g., client system/device 102) requesting assistance in association with a cyberattack on the second system, wherein the request comprises information indicating a type of the cyberattack. At 604, the first system selects a CI bot (e.g., one of the CI bots 118, CI bot 400, and the like) configured to respond to the type of cyberattack (e.g., via selection component 304). At 606, the first system then directs the CI bot to respond to the cyberattack, wherein the directing comprises enabling the CI bot to respond to the cyberattack by establishing a gateway (e.g., bot gateway/container 204) with the second system and employing the gateway to intercept and respond to traffic associated with the cyberattack on behalf of the second system (e.g., via bot application component 306).

FIG. 7 illustrates a flow diagram of another example method 700 for responding to cyberattacks using CI bot technology in accordance with one or more embodiments described herein. Repetitive description of like elements employed in other embodiments described herein is omitted for sake of brevity.

At 702, a first system receiving, by a first system operatively coupled to a processor (e.g., server system/device 114), receives (e.g., via reception component 302) a request from a second system (e.g., client system/device 102) requesting assistance in association with a cyberattack on the second system, wherein the request comprises information indicating a type of the cyberattack. At 704, the first system selects a CI bot (e.g., one of the CI bots 118, CI bot 400, and the like) configured to respond to the type of cyberattack (e.g., via selection component 304). At 706, the first system further directs the CI bot to respond to the cyberattack, wherein the directing comprises enabling the CI bot to respond to the cyberattack by establishing a gateway (e.g., bot gateway/container 204) with the second system and employing the gateway to intercept and respond to traffic associated with the cyberattack on behalf of the second system (e.g., via bot application component 306). At 708, the first system receives (e.g., via reception component 302) intelligence information gathered by the CI bot regarding the cyberattack in association with the employing the gateway to intercept and respond to the traffic. At 710, the first system further employs the intelligence information to train the CI bot using a machine learning model (e.g., via bot optimization component 308).

FIG. 8 illustrates a flow diagram of another example method 800 for responding to cyberattacks using CI bot technology in accordance with one or more embodiments described herein. Repetitive description of like elements employed in other embodiments described herein is omitted for sake of brevity.

At 802, a system comprising a processor (e.g., client system/device 102) detects a cyberattack on the system (e.g., via attack detection component 502). At 804, based on the detecting, the system sends a request to a cyberattack response system (e.g., server system/device 114) requesting assistance in association with responding to the cyberattack, wherein the request comprises information indicating a type of the cyberattack. At 806, based on receiving the information indicating the type of cyberattack the system, establishes (e.g., using CI bot communication component 506) a gateway (e.g., bot gateway/container 204) using a CI bot, (e.g., one of the CI bots 118, CI bot 400, and the like), selected by, configured by, and received from the cyberattack response system, wherein the CI bot has been configured to respond to the cyberattack on behalf of the system.

Figure 9:
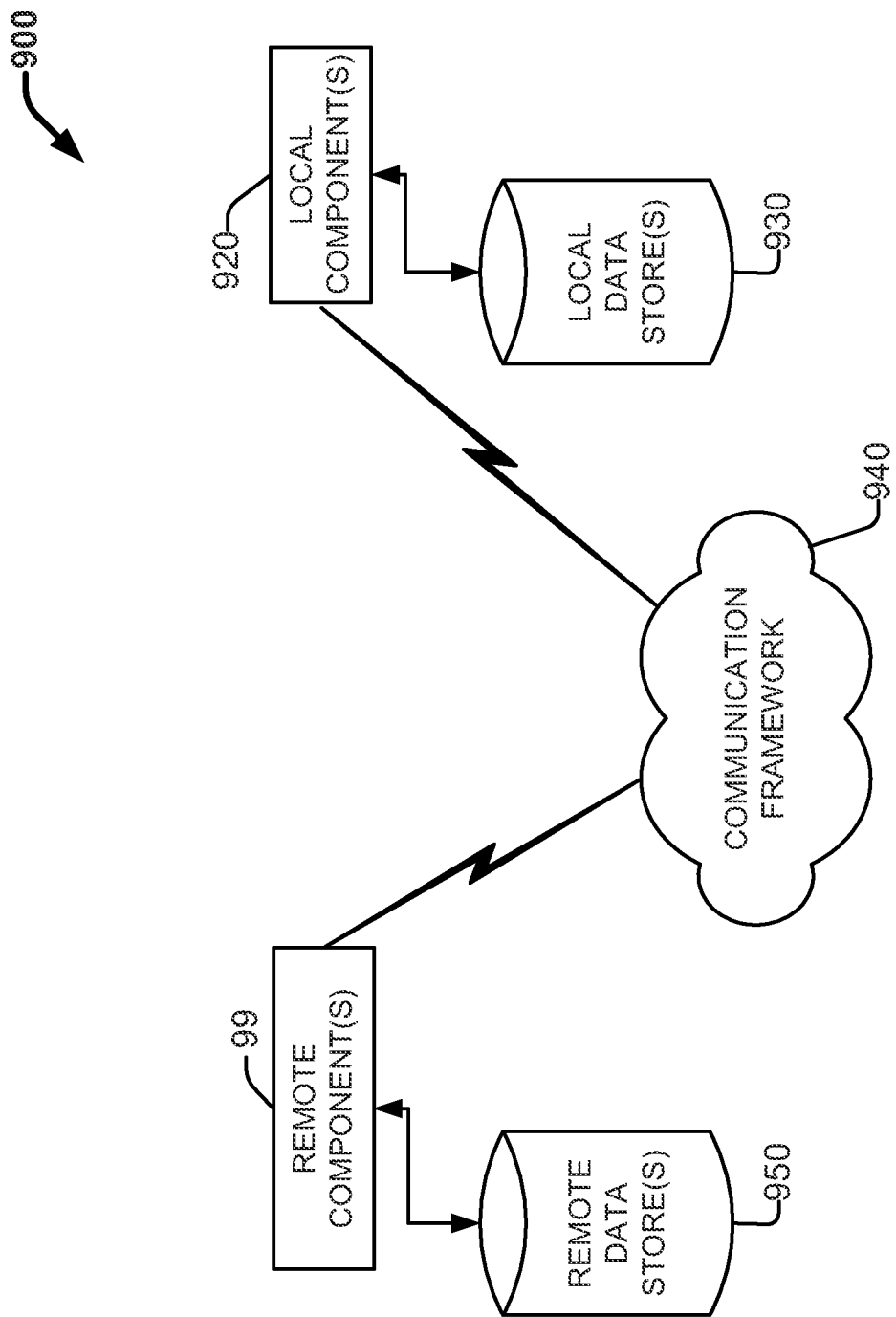
FIG. 9 illustrates a block diagram of an example, non-limiting operating environment in which one or more embodiments described herein can be facilitated.

FIG. 9 is a schematic block diagram of a computing environment 900 with which the disclosed subject matter can interact. The computing environment 900 comprises one or more remote component(s) 910. The remote component(s) 910 can be hardware and/or software (e.g., threads, processes, computing devices). In some embodiments, remote component(s) 910 can comprise servers, personal servers, wireless telecommunication network devices, RAN device(s), etc. As an example, remote component(s) 910 can included components associated with the server system/device 114 (e.g., the server cyberattack response module 116, the CI bots 118, CI bot 300, etc.) the external sources/systems 128, and the like. The computing environment 900 also comprises one or more local component(s) 920. The local component(s) 920 can be hardware and/or software (e.g., threads, processes, computing devices). In some embodiments, local component(s) 920 can comprise, for example, components associated with the client system/device 102 (e.g., the client cyberattack response module 104), and the like.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The computing environment 900 comprises a communication framework 940 that can be employed to facilitate communications between the remote component(s) 910 and the local component(s) 920, and can comprise an air interface, e.g., Uu interface of a UMTS network, via an LTE network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
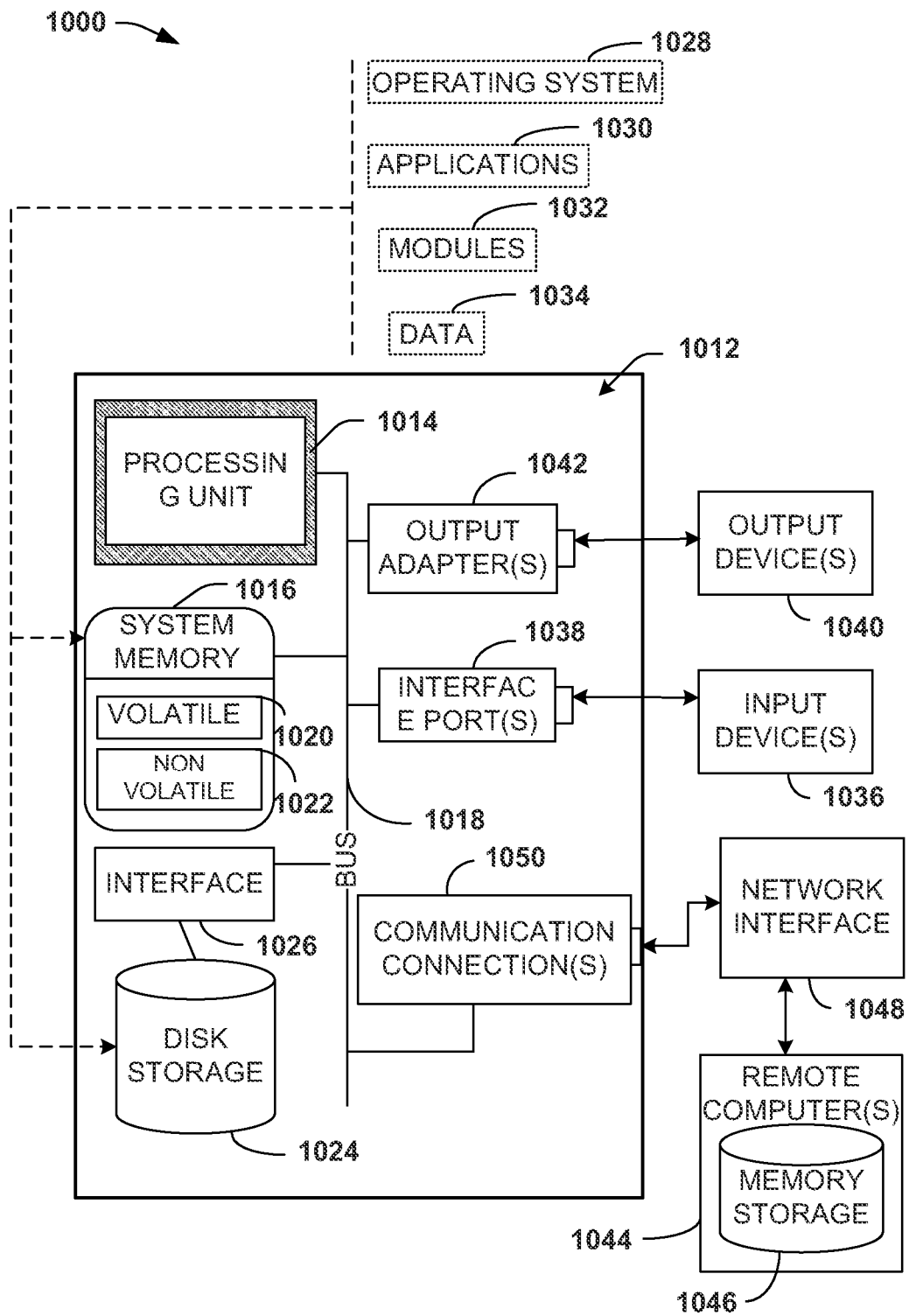
FIG. 10 illustrates a block diagram of a computer operable to facilitate management of communication systems in accordance with one or more embodiments described herein.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage device 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, notebook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a suitable operating environment 1000 operable to execute the disclosed systems and methods in accordance with an embodiment. Computer 1012, which can be, for example, part of the client system/device 102, and/or part of the server system/device 114. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 10104), and small computer systems interface.

System memory 1016 can comprise volatile memory 1020 and non-volatile memory 1022. A basic input/output system, containing routines to transfer information between elements within computer 1012, such as during start-up, can be stored in non-volatile memory 1022. By way of illustration, and not limitation, non-volatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising generating an RRC connection release message further comprising alterative band channel data.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can storing and/or processing data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "module," "bot," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "client device," "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP), long term evolution (LTE), third generation partnership project 2 (3GPP2), fifth generation partnership project (5GPP), ultra mobile broadband (UMB), high speed packet access (HSPA), Zigbee and other 802.XX wireless technologies and/or legacy telecommunication technologies. Further, the terms "femto" and "femto cell" are used interchangeably, and the terms "macro" and "macro cell" are used interchangeably.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A first system, comprising:
   a processor; and
   a memory that stores executable instructions that, when executed by the processor, facilitate performance of operations, comprising:
      receiving intelligence information regarding a cyberattack on a second system in association with performance of a reaction to the cyberattack;
      identifying a type of cyberattack based on the intelligence information;
      generating a counter intelligence bot based on the type of cyberattack; and
      employing the intelligence information to determine a tactic of a future reaction to the type of the cyberattack by the counter intelligence bot.

2. The first system of claim 1, wherein the operations further comprise:
   configuring the counter intelligence bot to perform the tactic in the future reaction to the type of the cyberattack.

3. The first system of claim 1, wherein the employing comprises determining the tactic based on an analysis of the intelligence information using a machine learning model generated from a machine learning process trained on historical data representative of previous tactics performed for respective types of previous cyberattacks.

4. The first system of claim 1, wherein the counter intelligence bot is configured to respond to the type of the cyberattack using pseudo responses to traffic requests received in association with the type of the cyberattack, and wherein the pseudo responses are tailored to the type of the cyberattack.

5. The first system of claim 1, wherein the counter intelligence bot is configured to respond only to the type of the cyberattack among different types of cyberattacks.

6. The first system of claim 1, wherein the generating of the counter intelligence bot based on the type of cyberattack comprises generating the counter intelligence bot utilizing one or more machine learning techniques.

7. The first system of claim 1, wherein the generating of the counter intelligence bot is responsive to reception of a request from the second system requesting assistance in association with responding to the cyberattack on the second system.

8. The first system of claim 7, wherein the operations further comprise:
   determining the type of the cyberattack based on information received with the request, wherein the information is at least one of: an internet protocol address associated with the cyberattack, a format of a traffic request associated with the cyberattack, a type of the traffic request, or a registration associated with the cyberattack.

9. The first system of claim 1, wherein the intelligence information comprises information representative of at least one of: a source of the cyberattack, a characteristic of traffic received from the source in association with the cyberattack, or an operation of the cyberattack.

10. The first system of claim 1, wherein the counter intelligence bot is configured to collect the intelligence information in association with the performance of the reaction for a period of time.

11. The first system of claim 10, wherein a duration of the period of time is based on detection of a trigger event associated with the cyberattack.

12. A method, comprising:
    receiving, by a first system comprising a processor, intelligence information regarding a cyberattack on a second system collected in association with performance of a reaction to the cyberattack;
    identifying, by the first system, a type of cyberattack based on the intelligence information;
    generating, by the first system, a counter intelligence bot based on the type of cyberattack; and
    employing, by the first system, the intelligence information to determine a tactic of a future reaction to the type of the cyberattack by the counter intelligence bot.

13. The method of claim 12, further comprising:
    configuring, by the first system, the counter intelligence bot to perform the tactic in the future reaction to the type of the cyberattack.

14. The method of claim 12, wherein the employing comprises determining, by the first system, the tactic based on analysis of the intelligence information using machine learning.

15. The method of claim 12, wherein the counter intelligence bot is configured to respond to the type of the cyberattack using pseudo responses to traffic requests received in association with the type of the cyberattack, and wherein the pseudo responses are tailored to the type of the cyberattack.

16. The method of claim 12, wherein the counter intelligence bot is configured to respond only to the type of the cyberattack among different types of cyberattacks.

17. The method of claim 12, wherein the generating of the counter intelligence bot based on the type of cyberattack comprises generating the counter intelligence bot utilizing one or more machine learning techniques.

18. The method of claim 17, comprising:
    determining, by the first system, the type of the cyberattack based on information received with request for assistance in responding to the cyberattack, wherein the information is selected from the group consisting of: an internet protocol address associated with the cyberattack, a format of a traffic request associated with the cyberattack, a type of the traffic request, and a registration associated with the cyberattack.

19. A non-transitory machine-readable medium, comprising executable instructions that, when executed by a processor, facilitate performance of operations, comprising:
   receiving intelligence information regarding an operation of a cyberattack on a system in association with reacting to the cyberattack;
   identifying a type of cyberattack based on the intelligence information;
   generating counter intelligence bot based on the type of cyberattack; and
   employing the intelligence information to determine a tactic of a future reaction to the type of the cyberattack by the counter intelligence bot.

20. The non-transitory machine-readable medium of claim 19, wherein the operations further comprise:
   configuring the counter intelligence bot to perform the tactic in anticipation of the future reaction to the type of the cyberattack.

* * * * *